(12) United States Patent
Needes et al.

(10) Patent No.: US 7,658,677 B2
(45) Date of Patent: Feb. 9, 2010

(54) FORCE LIMITING ASSEMBLY

(75) Inventors: Christopher Mark Needes, North Somerset (GB); Andrew Robert Slayne, Bristol (GB)

(73) Assignee: Saint-Gobain Performance Plastics Rencol Limited, Bristol (GB)

( * ) Notice: Subject to any disclaimer, the term of this patent is extended or adjusted under 35 U.S.C. 154(b) by 395 days.

(21) Appl. No.: 11/422,302

(22) Filed: Jun. 5, 2006

(65) Prior Publication Data
US 2006/0276246 A1 Dec. 7, 2006

(30) Foreign Application Priority Data
Jun. 6, 2005 (GB) .................. 0511494.7

(51) Int. Cl.
*F16D 7/02* (2006.01)
(52) U.S. Cl. ..................... 464/30; 464/162
(58) Field of Classification Search ........... 464/30, 464/31, 41, 89, 162; 403/288, 365
See application file for complete search history.

(56) References Cited

U.S. PATENT DOCUMENTS

| | | | | |
|---|---|---|---|---|
| 2,897,026 A * | 7/1959 | Haller et al. | ............. | 384/125 |
| 3,197,243 A * | 7/1965 | Brenneke | ............. | 403/372 |
| 3,345,711 A * | 10/1967 | McCarthy | | |
| 3,978,945 A * | 9/1976 | Gardner et al. | | |
| 4,222,246 A * | 9/1980 | Rongley | ............. | 464/30 |
| 4,286,894 A * | 9/1981 | Rongley | ............. | 403/372 |
| 4,636,106 A * | 1/1987 | Waisbrod | ............. | 403/228 |
| 4,790,683 A * | 12/1988 | Cramer et al. | ............. | 403/372 |
| 4,828,423 A * | 5/1989 | Cramer et al. | ............. | 403/372 |
| 5,607,023 A * | 3/1997 | Palm | ............. | 173/178 |
| 5,971,094 A * | 10/1999 | Joshita | ............. | 180/444 |
| 2003/0053260 A1 * | 3/2003 | Barina et al. | ............. | 360/265.6 |

OTHER PUBLICATIONS

USA Tolerance Rings, (USA Tolerance Rings Catalog) Apr. 4, 2004, [online], [retrieved on Aug. 15, 2008] Retrieved from the Wayback Machine of the Internet Archive using Internet <URL:http://web.archive.org/web/20050514152823/usatolerancerings.com/catalog.pdf>.*

* cited by examiner

*Primary Examiner*—Greg Binda
(74) *Attorney, Agent, or Firm*—Larson Newman & Abel, LLP; Chi Suk Kim

(57) ABSTRACT

An apparatus is shown which comprises first and second mating components with a force limiter located between them. The force limiter includes a band of resilient material, with protrusions therealong, and a slip element. The band and the slip element are secured to the first mating component with the band arranged to apply a radial force against the slip element so as to press it against the second mating component.

The frictional force between slip element and the second mating component is insufficient to separate the slip element and the band from the first mating component, so any slipping that occurs between the mating components happens at the boundary of the slip element and the second mating component.

A desired slip force can be obtained by choosing a slip element with an appropriate coefficient of friction, rather than by varying the dimensions of the components.

12 Claims, 6 Drawing Sheets

SECTION D-D

FORCE LIMITING ASSEMBLY

CROSS-REFERENCE TO RELATED APPLICATIONS

This application claims priority to Great Britain Application No. 0511494.7, filed Jun. 6, 2005, the entire contents of which are hereby incorporated by reference.

BACKGROUND OF THE INVENTION

1. Field of the Invention

This invention relates to force limiting assemblies such as torque limiters or tolerance rings, wherein the force limiter provides an interference fit between parts of an assembly.

2. Summary of the Prior Art

Force limiters limit the maximum amount of force than can be transmitted between parts of an assembly. Commonly, a first part of the assembly has a cylindrical portion located in a cylindrical bore of a second part. The invention particularly relates to assemblies having a force limiter that provides an interference fit between a cylindrical component such as a shaft or a bearing and a housing for the shaft.

Very close tolerances are required where press fits, splines, pins or keyways are employed to transmit forces in applications such as pulleys, flywheels or driveshafts.

Force limiters may be used to provide an interference fit between parts required to transmit torque or parts required to transmit linear forces. Force limiters such as tolerance rings provide a low cost means of providing an interference fit between parts that may not be machined to exact dimensions. Tolerance rings have a number of other potential advantages, such as compensating for different linear coefficients of expansion between the parts, allowing rapid apparatus assembly, and durability.

A tolerance ring generally comprises a band of resilient material, for example a metal such as spring steel, the ends of which are brought together to form a ring. A strip of protrusions extend radially outwards from the ring, or radially inwards towards the centre of the ring. Usually, the protrusions are formations, possibly regular formations, such as corrugations, ridges, waves or fingers.

When the ring is located in the annular space between, for example, a shaft and a bore in a housing in which the shaft is located, the protrusions are compressed. Each protrusion acts as a spring and exerts a radial force against the shaft and the surface of the bore, providing an interference fit between the shaft and the housing. Rotation of the housing or the shaft will produce similar rotation in the other of the shaft or the housing, as torque is transmitted by the ring. Likewise, linear movement of the housing or the shaft will produce similar linear movement in the other of the shaft or the housing, as the linear force is transmitted by the ring. If forces (rotational or linear) are applied to one or both of the shaft and the housing, such that the resultant force between the mating components is higher than a certain threshold value, the shaft or housing will move relative to one another, i.e. they will slip. In this application, this threshold value is referred to as the "slip force" of the shaft, housing and torque limiter apparatus.

Typically, the band of protrusions is axially flanked by annular regions of the ring that have no formations (known in the art as "unformed regions" of the tolerance ring).

Although tolerance rings usually comprise a strip of resilient material that is curved to allow the easy formation of a ring by overlapping the ends of the strip, they may also be manufactured as an annular band.

The term "shaft" as used hereafter includes any assembly component with a generally cylindrical portion such as a shaft or a bearing.

SUMMARY OF THE INVENTION

For most applications, force limiters such as tolerance rings are designed to transmit relatively high levels of torque or linear forces between mating components (so the slip force between the mating components is relatively high). The slip force is proportional to the force applied by the tolerance ring on the mating components, and the friction coefficients of the tolerance ring and the mating components. The force applied by the tolerance ring depends on the strength of the tolerance ring protrusions, and the amount by which the protrusions are compressed. Because of the dimensional tolerances on the mating components and the protrusions, there is a limited range by which the tolerance ring protrusions can be compressed, giving rise to a limited range of forces available. For applications requiring relatively low slip forces, such as those requiring manual adjustment of mating components, even with relatively weak protrusions, the forces applied by the tolerance ring on the mating components may be too high to guarantee controlled low slip forces.

It is an object of the present invention to provide a force limiter which, in combination with mating components, gives controlled, relatively low, slip forces between the mating components.

Thus, according to a first aspect of the present invention, there is provided an apparatus comprising:

first and second mating components, the first and second mating components being, respectively, either:

a housing having a bore with a shaft therein, and the shaft, or a shaft, and a housing having a bore with the shaft therein; and a force limiter, the force limiter including a band of resilient material having a strip of protrusions extending thereal ong, and a slip element;

wherein the band and the slip element are secured to the first mating component, and the slip element is frictionally engaged with the second mating component, the band applying a radial force against the slip element so as to press the slip element into contact with the second mating component, and wherein the securing of the slip element and the band with the first mating component has a securing strength which exceeds the frictional force between the slip element and the second mating component.

Accordingly, when a resultant force is applied between the first and second mating components that is greater than the slip force, slipping of the apparatus components occurs at the boundary of the slip element and the second mating component.

Preferably, the slip element is secured to the first mating component by being fixed, e.g. glued, welded or pinned, to the first mating component. In this case, the securing strength of the securing results from the quality and quantity of gluing, welding or pinning, respectively, between the slip element and the first mating component. The fixing must be stronger than the frictional engagement between the slip element and the second mating component, so that the slip element and the band will remain secure to the first mating component whilst any slipping occurs at the boundary between the slip element and the second mating component. In order to provide a surface of the slip element adjacent the first mating component, which is suitable for fixing to the first mating component, the slip element may straddle the band. Alternatively, the securing of the slip element to the first mating component may be provided through frictional engagement between the slip element and the first mating component. With this arrangement, the securing strength of the securing results from the magnitude of the frictional engagement between the slip element and the first mating component, i.e. the value of the coefficient of friction of each of the slip element and the first mating component, the degree of interference between them, and the size of the area over which they are in contact.

In any case, the band may also be secured to the first mating component by the securing of the slip element to the first mating component.

Axial movement of the slip element relative to at least one of the first and second mating components may be prevented in at least one direction, for example by the slip element including a lip which projects radially such that it contacts at least part of an axial end of the first or second mating component. With this arrangement, when the slip element is located between the mating components it is prevented by the lip from sliding axially in one direction relative to the first mating component. This is useful during assembly of the apparatus as, for example, when the first mating component is a housing and the second mating component is a shaft, the band and slip element can first be inserted into a bore inside the housing, and then the shaft can be inserted though an opening in the radial centre of the slip element without the slip element sliding further into the bore. Another alternative for the securing of the slip element and the band to the first mating component is for the securing to be provided through frictional engagement between the slip element and the band, and the band and the first mating component. This frictional engagement must be stronger than the frictional engagement between the slip element and the second mating component as explained above.

Preferably, the slip element extends the entire length of the band. The band and/or the slip element may extend partly or entirely around the perimeter of the shaft. When the slip element extends only partly around the shaft its end are free to approach each other or separate as required, so it is more easily pressed against the second mating component by the radial force exerted by the band.

The band may be a tolerance ring. The protrusions may extend radially outwards from the ring, or radially inwards towards the centre of the ring. Preferably, the protrusions are formations, e.g. regular formations, such as corrugations, ridges or waves. Alternatively the protrusions may be sprung fingers that project from the strip; this configuration is preferable when relatively low slip forces are required. The sprung fingers may project at an oblique angle, radially outwardly or radially inwardly from the ring.

The strip of protrusions may be axially flanked by annular regions of the band of resilient material that have no formations.

The shaft may have a circular cross-section, or a cross-section having one or more flat edges, e.g. a triangular, square, rectangular, or hexagonal cross-section etc.

When the cross-section of the shaft has one or more flat edges, the band and/or slip element may each have one or more corresponding flat sections which, in combination, extend partly or entirely around the perimeter of the shaft.

Preferably, when either the band or the slip element engages the housing, they engage, in particular, the wall of the bore of the housing.

To obtain a desired slip force, the material of the slip element can be chosen to have an appropriate coefficient of friction. Lower values of slip forces can be obtained more reliably by choosing a material with a lower coefficient of friction for the slip element, rather than by varying the dimensions of the band and/or the mating components in order to reduce the press force applied by the strip of protrusions.

Preferably, the slip element comprises a main ring portion axially flanked on one or both sides by flange portions. The ring portion may be a complete ring, or a split ring. The flange portion(s) project towards the mating component to which the slip element is fixed (i.e. towards the first mating component). Accordingly, the flange portion(s) may project radially inwardly or radially outwardly, depending on whether the first mating component is the housing having the bore, or the shaft.

The flange portion(s) preferably have a surface, at their respective distal ends, for fixing to the first mating component. The flange portions may be spaced apart by a distance approximately equal to, or larger than, the width of the band of resilient material, such that the slip element may straddle the band.

Accordingly, the band of resilient material may be fully or partially enclosed by the slip element and the first mating component. Thus, manufacture of the mating components and the tolerance ring apparatus may be straightforward, since both the slip element and the band of resilient material may be essentially fixed in position with respect to the first mating component before both the mating components are brought together for an interference fit.

The force limiter of the apparatus may further include a second band of resilient material with a strip of protrusions extending therealong. This second band may again be a tolerance ring and may extend partly or entirely around the perimeter of the shaft.

In this case, the slip element may comprise two main ring portions, the first main ring portion being axially flanked on both sides by first and second flange portions which project towards the first mating component, and the second main ring portion being axially flanked on both sides by said second and a third flange portion, which third flange portion also projects towards the first mating component. The main ring portions of the slip element may be a complete ring or a split ring, as described above.

Furthermore, in this case, the first and second flange portions may be spaced apart by a distance approximately equal to the width of one of the first or second bands of resilient material, and the second and third flange portions may be spaced apart by a distance approximately equal to the width of the other of the first or second bands of resilient material, such that the slip element straddles each of the bands with the second flange portion located between the bands. Accordingly, each band of resilient material may be at least partially enclosed by the slip element and the first mating component.

The force limiter of the first aspect of the invention is particularly suitable for apparatuses where an interference fit between mating components has to be relatively low and controlled, for example steering column axial adjustment mechanisms, where the steering column is to be adjustable in length by the driver of the vehicle. However, it will be appreciated by those in the art that there are other possible arrangements to which the invention can be applied.

According to a second aspect of the present invention, there is provided a method of limiting to a threshold value a force transmitted between parts of an apparatus, said apparatus comprising:

first and second mating components, the first and second mating components being, respectively, either:

a housing having a bore with a shaft therein, and the shaft, or a shaft, and a housing having a bore with the shaft therein; and a force limiter, the force limiter including a band of resilient material having a strip of protrusions extending thereaIong, and a slip element;

wherein the band and the slip element are secured to the first mating component, and the slip element is frictionally engaged with the second mating component, the band applying a radial force against the slip element so as to press the slip element into contact with the second mating component, and wherein the securing of the slip element and the band with the first mating component has a securing strength which exceeds the frictional force between the slip element and the second mating component, the method comprising the step of applying a force to one or both of the first and second mating components, wherein, when the resultant force between the first and second mating components exceeds the strength of the frictional engagement between the slip element and the second mating component, the slip element and the second mating component move relative to one another.

BRIEF DESCRIPTION OF THE DRAWINGS

Embodiments of the present invention will now be described in detail, by way of example, with reference to the accompanying drawings, in which.

DETAILED DESCRIPTION

Figure 1:
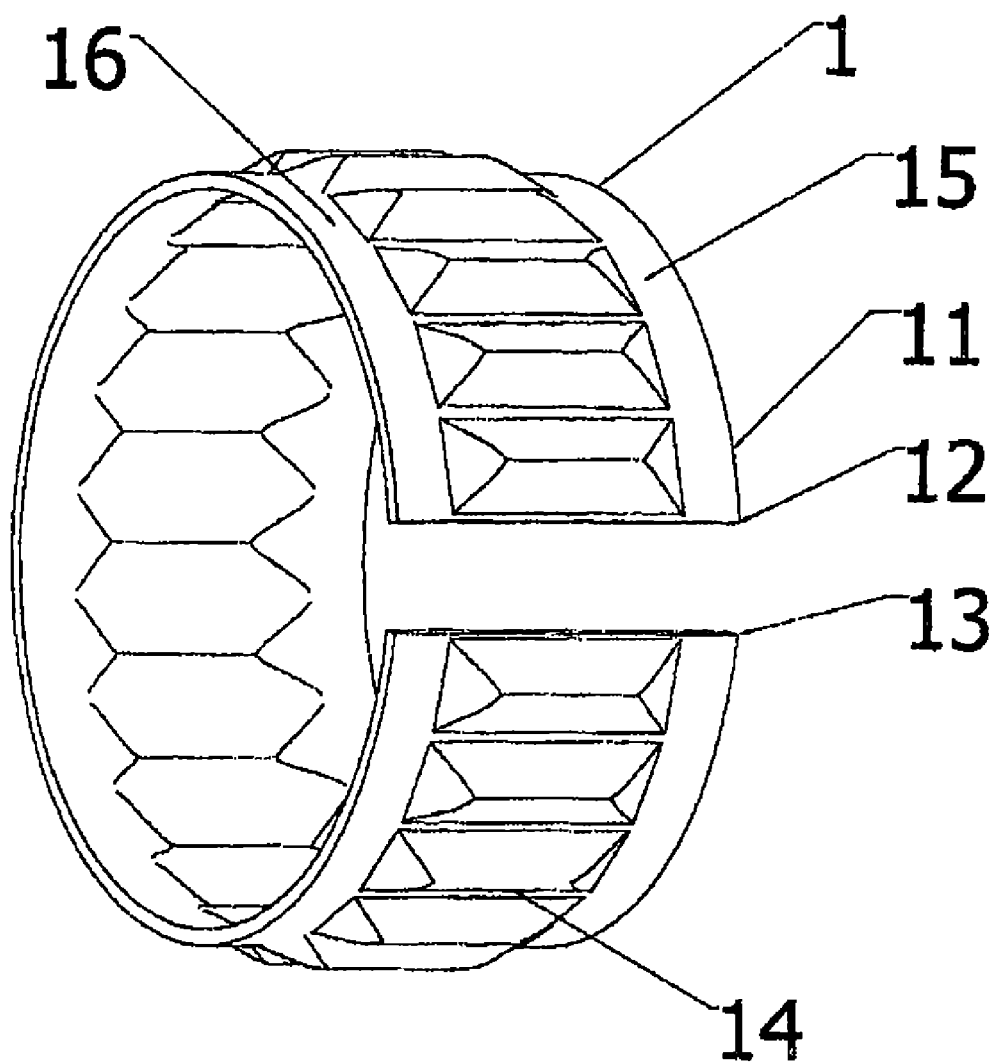
FIG. 1 shows an oblique view of a known tolerance ring.

A known tolerance ring 1 is shown in FIG. 1. The tolerance ring 1 comprises a band of resilient material 11, for example a metal such as spring steel, the ends 12, 13 of which are brought together to form a ring. A strip of protrusions 14 extend radially outwards from the ring. The protrusions 14 are regular corrugated formations. The strip of protrusions 14 is axially flanked by annular regions 15, 16 of the band of resilient material 11 that have no formations.

Figure 2:
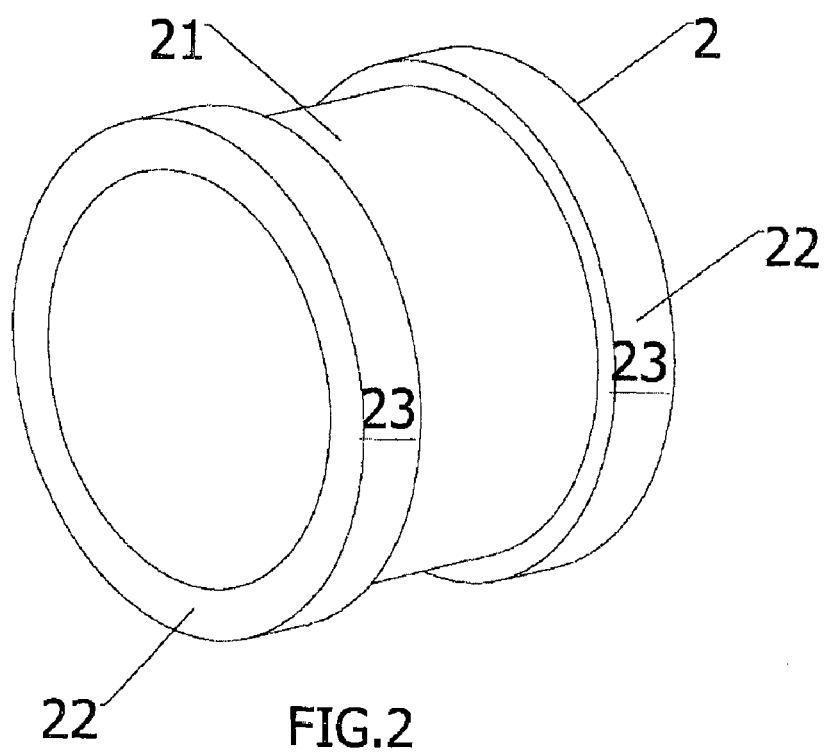
FIG. 2 shows an oblique view of a slip element of the present invention.

FIG. 2 shows a slip element 2 according to the present invention. The slip element 2 comprises a main ring 21 of flexible material, axially flanked by two circular flanges 22.

The slip element 2 is dimensioned such that a tolerance ring, e.g. the tolerance ring of FIG. 1, can be fitted around the circumference of the main ring 21 whereupon it fits between the flanges 22. Ideally, the tolerance ring is fitted tightly between the flanges 22, whereupon it abuts the main ring 21.

Figure 3:
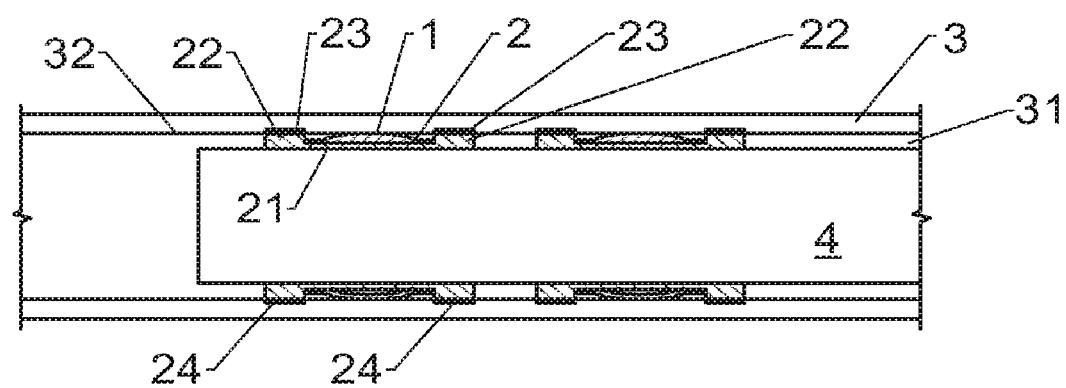
FIG. 3 shows mating components fitted with a first embodiment of a tolerance ring assembly of the present invention.

FIG. 3 shows a first embodiment of a force limiter according to the present invention that provides an interference fit between two mating components, e.g. mating components of a length adjustable steering wheel column assembly. One of the mating components is e.g. an outer jacket of the steering column, which essentially comprises a housing 3 having a bore 31 therein. The other of the mating component is e.g. an inner tube 4 of the steering column assembly.

The force limiter comprises a tolerance ring 1, e.g. as described above with reference to FIG. 1, which is fitted around the slip element 2 as described above with reference to FIG. 2. Both the slip element 2 and the tolerance ring 1 extend entirely around the perimeter of the shaft 4.

The shaft 4 extends through an opening provided through the radial centre of the slip element 2. The radially inner surface of the main ring 21 of the slip element 2 is frictionally engaged with the surface of the shaft 4.

FIG. 3 in fact shows two force limiters according to the present invention, which are spaced apart along the axis of the bore 31. Using two force limiters in this manner increases the stability of axial alignment between the shaft 4 and the bore 31.

The flanges 22 project towards the wall 32 of the bore 31. The distal ends of the flanges 22 each have a radially outwardly facing surface 23 which is fixed to the wall 32 of the bore 31. The surfaces 23 are fixed to the wall 32 by glue 24, pins, welds or by the interaction of engagement features that are e.g. press formed into the surfaces 23 and the wall, or by other appropriate fixing means. However, it will be appreciated that the surfaces 23 may be secured to the wall 32 of the bore 31 through frictional engagement between the surfaces 23 and the wall 32.

The tolerance ring 1 is fitted to the radially outer side of the slip element 2 such that it is completely enclosed by the main ring 21, the flanges 22 and the wall 32 of the bore 31. Thus, the tolerance ring 1 is secured to the housing 3 by the securing of the slip element 2 to the housing 3.

During manufacture, before the slip element is fixed to the wall 32 of the bore 31, the tolerance ring fitted around the main ring 21 of the slip element 2 protrudes further, radially, than the flanges 22 of the slip element 2. Accordingly, when the slip element is fixed to the wall 32 of the bore 31, the tolerance ring is compressed, whereupon it presses against the main ring 21 of the slip element 2. This pressing force causes the main ring 21 to flex towards the shaft 4, thus increasing the friction force between the slip element and the shaft 4.

In use, if forces (rotational or linear) are applied to one or both of the mating components 3, 4, such that the resultant force between the mating components is lower than the slip force value, the mating components will move in concert with one another, because the force will be transmitted between the mating components through the tolerance ring assembly.

If, however, the resultant force exceeds the slip force value, the mating components 3, 4 will move, i.e. slip, with respect to one another. This slipping occurs at the boundary between the slip element 2 and the surface of the shaft 4.

The value of the slip force is therefore dictated by the frictional force between the slip element 2 and the surface of the shaft 4. This frictional force, and thus the slip force, can be adjusted by e.g. varying the dimensions of the tolerance ring 1, in order to vary the press force it applies against the slip element 2 and/or by varying the type of material used for the slip element 2, in order to change the coefficient of friction of the slip element 2.

If lower values of slip force are required, a slip element 2 with a lower coefficient of friction is can be used. This is advantageous since the dimensional tolerance of the tolerance ring 1 and mating components 3,4 are such that the range of forces that the tolerance ring 1 can apply, under compression, may not be sufficiently low to guarantee controlled relatively low slip forces. Choosing a slip element 2 with a lower coefficient of friction allows the slip force to be lowered without the force applied by the tolerance ring requiring to be lowered.

Figure 4:
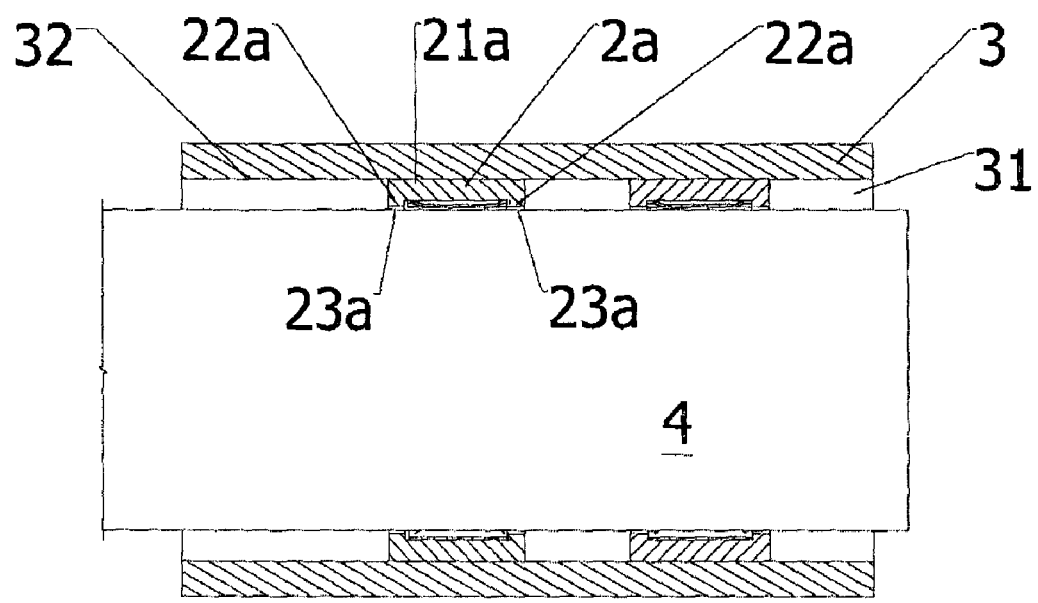
FIG. 4 shows mating components fitted with a second embodiment of a tolerance ring assembly of the present invention.

FIG. 4 shows a second embodiment of a force limiter according to the present invention used to provide an interference fit between two mating components 3, 4, and works in a similar manner to the assembly of the first embodiment (the same reference numerals are given to identical components of FIGS. 3 and 4); however, the slip element 2a is fixed to the shaft 4, instead of the wall 32 of the bore 31, and is frictionally engaged with the wall 32 of the bore 31.

Accordingly, the flanges 22a of the slip element 2a project radially inwardly from the flexible main ring 21a, and the radially inwardly facing surfaces 23a, at the distal ends of the flanges 22a, are fixed to the surface of the shaft 4.

The tolerance ring 1 is fitted to the radially inner side of the slip element 2a such that it is completely enclosed by the main ring 21a, the flanges 22a and the surface of the shaft 4.

With the configuration shown in FIG. 4, slipping of the mating components occurs at the boundary between the slip element 2a and the wall 32 of the bore 31.

Figure 5:
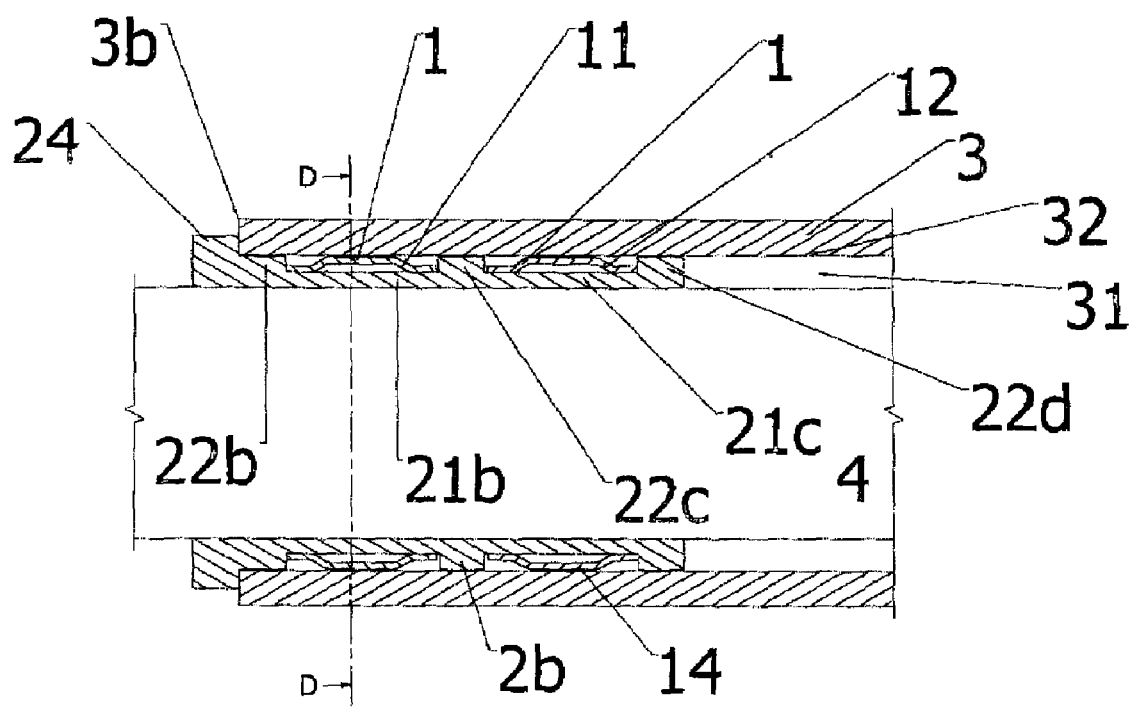
FIG. 5 shows mating components fitted with a third embodiment of a tolerance ring assembly of the present invention.

FIG. 5 shows a third embodiment of a force limiter according to the present invention that provides an interference fit between two mating components 3, 4 and again works in a similar way to the assembly of the first embodiment shown in FIG. 3. The same reference numerals are given to identical components.

Figure 6:
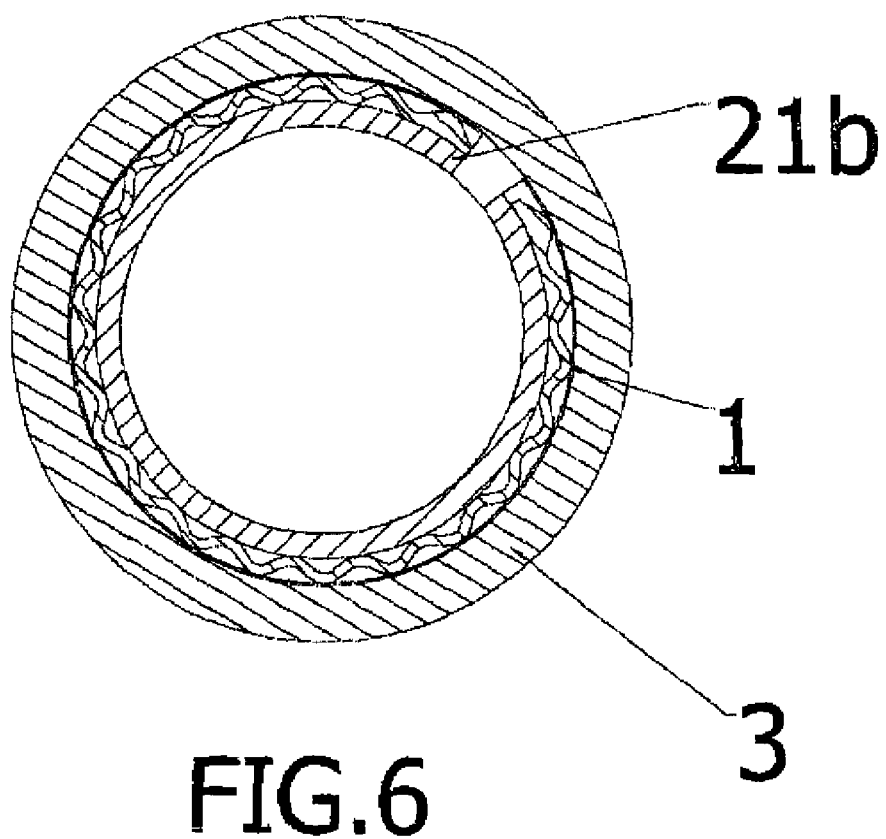
FIG. 6 shows a cross sectional view through the components of FIG. 5.

However, in this third embodiment, the force limiter includes two axially separated tolerance rings 1 each comprising a band of resilient material 11, 12 and each having a strip of protrusions 14 extending therealong. To operate with these two bands 11, 12, the slip element 2b comprises two main ring portions 21b, 21c. The first main ring portion 21b is axially flanked on both sides by first and second flange portions 22b, 22c which project towards the first mating component (housing 3), and the second main ring portion 21c is axially flanked on both sides by said second and a third flange portion (22c and 22d respectively). The third flange portion 22d also projects towards the housing 3. The first and second flange portions 22b, 22c are spaced apart by a distance equal to the width of the first band of resilient material 11, and the second and third flange portions 22c, 22d are spaced apart by a distance equal to the width of the second band of resilient material 12, such that the bands of resilient material 11, 12 are each enclosed by the slip element 2b and the housing 3. In other words, the bands 11, 12 are located in grooves between the flange portions 22b, 22c and 22d. The tolerance ring 1 (comprising band 11) and the slip element 2b extend only partly around the perimeter of the shaft 4, as shown in FIG. 6, which is a cross sectional view along line D-D of FIG. 5.

The assembly of the slip element 2b and the bands 11, 12 is again as described above with reference to FIGS. 2 and 3, but the securing of the slip element 2b and the bands 11, 12 to the housing 3 is provided through frictional engagement between the slip element 2b and the bands 11, 12, and the bands 11, 12 and the housing 3.

The arrangement and operation of components in the third embodiment is then the same as in the first embodiment, with slipping of the mating components 3, 4 occurring at the boundary between the slip element 2b and the surface of the shaft 4.

It will be noted that the embodiment in FIG. 4 may be similarly modified to have two bands each located in one of two main ring portions of the slip element, with the bands located in grooves between pairs of flange portions such that they are enclosed by the slip element and the shaft 4. Slipping of the mating components would then occur at the boundary between the slip element and the wall 32 of the bore 31.

The third embodiment in FIG. 5 further shows the slip element 2b located at one end of the bore 31 and, aside from the flanges 22b, 22c, and 22d which project towards the wall 32 of the bore 31, the slip element 2b further has a lip 24 which projects further radially outwards such that it contacts part of an axial end 3b of the housing 3, i.e. an end of the first mating component to which the slip element 2b is secured. With the slip element 2b located between the housing 3 and the shaft 4 as shown, it is prevented by the lip 24 from sliding axially in one direction (right as FIG. 5 is drawn) relative to the housing 3.

This arrangement is useful during assembly of the apparatus as, after the bands 11, 12 have been fitted to the radially outer side of the slip element 2b, they can both be inserted into the bore 31 inside the housing 3 and then the shaft 4 can be inserted though an opening in the radial centre of the slip element 2b without the slip element 2b sliding further into the bore 31.

It will be noted that the embodiment in FIG. 4 may be similarly modified, such that the slip element is again located at one end of the bore 31 (as in the third embodiment) and, aside from the flanges which project towards the surface of the shaft 4, the slip element further has a lip which projects further radially inwards such that it contacts part of an axial end of the shaft 4. Slipping of the mating components would then occur at the boundary between the slip element and the wall 32 of the bore 31.

What is claimed is:

1. A length adjustable coaxial apparatus comprising:
   a first mating component being a housing having a bore;
   a second mating component being a shaft; and
   a force limiter including a tolerance ring comprising an annular band of resilient material having a strip of protrusions extending radially therefrom and a slip element;
   wherein the shaft is located coaxially in the bore; and
   wherein the band and the slip element are secured to the first mating component by fixing the slip element to the first mating component using one of gluing, welding, or pinning to prevent relative axial movement between the first mating component and both the tolerance ring and the slip element, and the slip element is frictionally engaged with the second mating component, the slip element being located between the tolerance ring and the second mating component and the protrusions extending from the band being compressed between the first and second mating components to apply a resilient radial force against the slip element so as to press the slip element into contact with the second mating component; and
   wherein the securing of the slip element and the band with the first mating component has an axial securing strength which exceeds an axial frictional force between the slip element and the second mating component to provide an axial slip interface between the slip element and the second mating component.

2. A length adjustable coaxial apparatus according to claim 1, wherein the slip element includes a lip which projects radially such that it contacts at least part of an axial end of the first or second mating component to prevent axial movement in one direction of the slip element relative to the first or second mating component.

3. A length adjustable coaxial apparatus according to claim 1, wherein the force limiter includes a second band of resilient material having a strip of protrusions extending therealong.

4. A length adjustable coaxial apparatus according to claim 1, wherein the slip element extends along the entire length of the band.

5. A length adjustable coaxial apparatus according to claim 1, wherein the band extends entirely around the perimeter of the shaft.

6. A length adjustable coaxial apparatus according to claim 1, wherein the band extends only partly around the perimeter of the shaft.

7. A length adjustable coaxial apparatus according to claim 1, wherein the slip element extends entirely around the perimeter of the shaft.

8. A length adjustable coaxial apparatus according to claim 1, wherein the slip element extends only partly around the perimeter of the shaft.

9. A length adjustable coaxial apparatus comprising:
a first mating component being a housing having a bore;
a second mating component being a shaft located coaxially in the bore; and
a force limiter including a tolerance ring comprising an annular band of resilient material having a strip of protrusions extending radially therefrom and a slip element, the slip element including a main ring portion axially flanked on one or both sides by flange portions which project towards the first mating component, the band and the slip element are secured to the first mating component by fixing the flange portions to the first mating component using one of gluing, welding, or pinning to prevent relative axial movement between the first mating component and both the tolerance ring and the slip element, and the slip element is frictionally engaged with the second mating component, the slip element being located between the tolerance ring and the second mating component and the protrusions extending from the band being compressed between the first and second mating components to apply a resilient radial force against the slip element so as to press the slip element into contact with the second mating component; and
wherein the securing of the slip element and the band with the first mating component has an axial securing strength which exceeds an axial frictional force between the slip element and the second mating component to provide an axial slip interface between the slip element and the second mating component.

10. A length adjustable coaxial apparatus according to claim 9, wherein the flange portions are spaced apart by a distance approximately equal to the width of the band of resilient material, such that the band of resilient material is at least partially enclosed by the slip element and the first mating component.

11. A length adjustable coaxial apparatus comprising:
a first mating component being a housing having a bore;
a second mating component being a shaft located coaxially in the bore; and
a force limiter including first and second tolerance rings each comprising an annular band of resilient material having a strip of protrusions extending radially therefrom and a slip element, the slip element including two main ring portions, the first main ring portion being axially flanked on both sides by first and second flange portions which project towards the first mating component, and the second main ring portion being axially flanked on both sides by said second and a third flange portion, which third flange portion also projects towards the first mating component, the band and the slip element are secured to the first mating component by fixing the first, second, and third flange portions to the first mating component using one of gluing, welding, or pinning to prevent relative axial movement between the first mating component and both the tolerance rings and the slip element, and the slip element is frictionally engaged with the second mating component, the slip element being located between the tolerance rings and the second mating component and the protrusions extending from the band being compressed between the first and second mating components to apply a resilient radial force against the slip element so as to press the slip element into contact with the second mating component; and
wherein the securing of the slip element and the band with the first mating component has an axial securing strength which exceeds an axial frictional force between the slip element and the second mating component to provide an axial slip interface between the slip element and the second mating component.

12. A length adjustable coaxial apparatus according to claim 11, wherein the first and second flange portions are spaced apart by a distance approximately equal to the width of one of the first or second bands of resilient material, and the second and third flange portions are spaced apart by a distance approximately equal to the width of the other of the first or second bands of resilient material, such that the bands of resilient material are each at least partially enclosed by the slip element and the first mating component.

* * * * *